United States Patent [19]
Gong et al.

[11] Patent Number: 5,394,350
[45] Date of Patent: Feb. 28, 1995

[54] SQUARE COMPUTATION CIRCUIT

[75] Inventors: Jun-jin Gong, Seongnam; Hyun-woo Park, Suwon; Hyun-gi Baek, Seoul, all of Rep. of Korea

[73] Assignee: Samsung Electronics Co., Ltd., Kyungki-do, Rep. of Korea

[21] Appl. No.: 165,322

[22] Filed: Dec. 13, 1993

[30] Foreign Application Priority Data

Dec. 31, 1992 [KR] Rep. of Korea ............... 1992-27557

[51] Int. Cl.⁶ ............................................. G06F 7/552
[52] U.S. Cl. ..................................................... 364/753
[58] Field of Search ............................... 364/753, 757

[56] References Cited

U.S. PATENT DOCUMENTS

| | | | |
|---|---|---|---|
| 3,610,906 | 10/1971 | Stampler | 364/757 |
| 3,780,278 | 12/1973 | Way | 364/753 |
| 4,313,174 | 1/1982 | White | 364/753 |
| 4,766,416 | 8/1988 | Noujaim | 364/753 |
| 4,787,056 | 11/1988 | Dieterich | 364/753 |
| 5,337,267 | 8/1994 | Colavin | 364/753 |

OTHER PUBLICATIONS

Messer, D. D., "Convolutional Encoding and Viterbi Decoding Using the DSP56001 with a V.32 Modem Trellis Example," Motorola, Inc. 1989.

Fagan, A. et al., "Single DSP Chip Implementation of a High Speed Echo Cancelling Modem Employing Trellis Coding," *Proc. of the Intnl. ESA Workshop on DSP Techniques Applied to Space Communications*, Nov. 1988.

Primary Examiner—David H. Malzahn
Attorney, Agent, or Firm—Rothwell, Figg, Ernst & Kurz

[57] ABSTRACT

A square computation circuit outputs data of 4-bits to 12-bits by inputting the input data of 2-bits to 6-bits, respectively. The relationships between inputs and outputs are obtained and then simplified, which simplifies circuit configuration and increases processing speed, over the case of the square computation performed using a conventional multiplier.

5 Claims, 6 Drawing Sheets

SQUARE COMPUTATION CIRCUIT

BACKGROUND OF THE INVENTION

The present invention relates to a square computation circuit, and more particularly, to an apparatus for computing the branch evaluation values within a Viterbi decoder in the trellis-coded modulation (TCM) method which is the combination of coding and modulating methods for correcting errors produced on a digital transmission channel.

The Viterbi decoder used in the TCM method has to compute the branch evaluation values by the euclidean distance between the symbol to be decoded and the transferred symbol.

Figure 1:
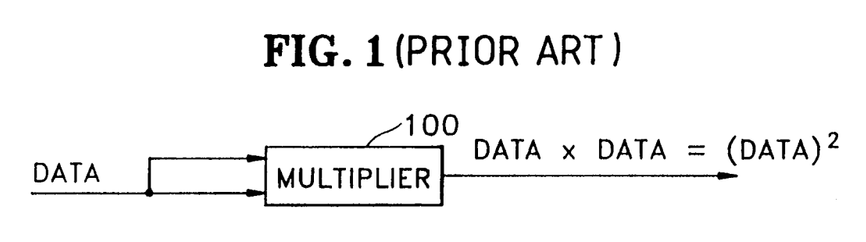
FIG. 1 shows a method for performing a conventional square computation.

In order to compute the euclidean distance between two symbols, a process of computing the square of data is necessary. Typically, since the TCM method is embodied by means of a digital signal processor, a multi7plier is used in the square computation process, as illustrated in FIG. 1. The implementation of the trellis coded modulation method using a digital signal processor is disclosed in the papers entitled "Single DSP Implementation of a High Speed Echo Canceling Modem Employing Trellis Coding" (see *Proceedings of the International ESA Workshop on DSP Techniques Applied to Space Communications*, November 1988, by A. Fagon et al.) and "Convolutional Encoding and Viterbi Decoding Using the DSP 56001 with a V.32 Modem Trellis Example" (by Dion D. Messer of Motorola, 1989). It is proper to use a multiplier in computing the multiplication of general data, but the computation of the square is a specific case of multiplication computation. Therefore, it is desirable to use a multiplication circuit embodied exclusively for computing the square.

SUMMARY OF THE INVENTION

It is an object of the present invention to provide a square computation circuit which can reduce circuit size by eliminating unnecessary logic in performing data square multiplication by means of a multiplication computing circuit exclusively constructed for square computation, and greatly increasing processing speed.

To solve the above object, the square computation circuit according to the present invention obtains and simplifies a logical equation of a square computation circuit of n-bit data, for performing a square computation of the n-bit data, and thereby implementing a logic circuit according to the logic equation.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

The present invention will be described with reference to the accompanying drawings.

Figure 2:
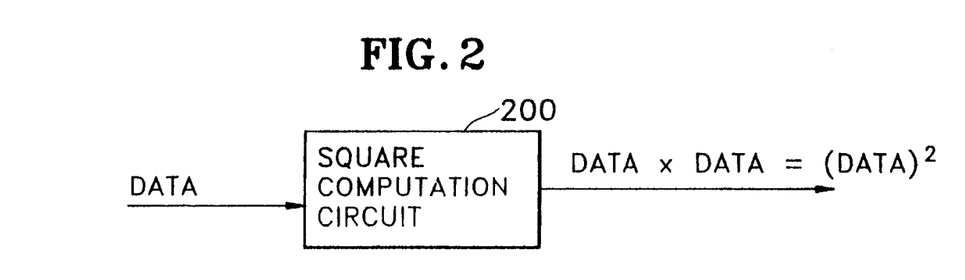
FIG. 2 shows a method for performing a square computation according to the present invention.

FIG. 2 is a block diagram showing a square computation circuit according to the present invention.

FIG. 2, the square of n-bit binary data A ($A_{n-1}$, $A_{n-2}$, $A_{n-3}$..., $A_1$, $A_0$) becomes 2n-bit data $A^2$($P_{2n-1}$, $P_{2n-2}$, $P_{2n-3}$..., $P_1$, $P_0$). In this case, since there is a certain logical correlation between the data A whose square is to be obtained and the operated data $A^2$, a combination logic circuit can be constructed by obtaining such a correlation.

Figure 3:
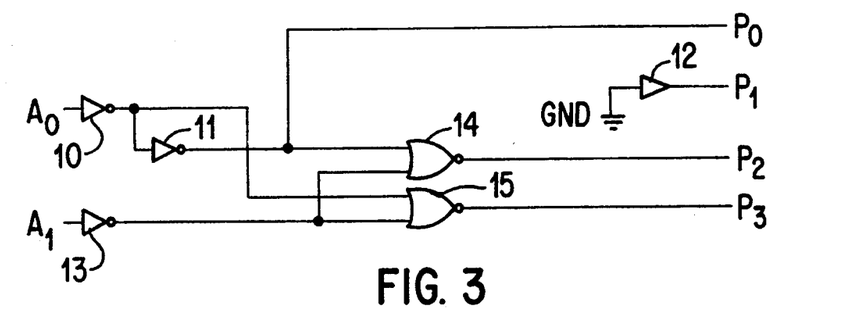
FIG. 3 shows a 2-bit square computation circuit.

The relationship for 2-bit data is induced as follows.

$$P_0 = A_0$$

$$P_1 = 0$$

$$P_2 = \overline{A_0} \vee \overline{A_1}$$

$$P_3 = \overline{\overline{A_0} \vee \overline{A_1}}$$

FIG. 3 shows a 2-bit square computation circuit of the present invention according to the above equations.

In FIG. 3, the 2-bit square computation circuit for outputting a 4-bit data ($P_0 P_1 P_2 P_3$) by inputting 2-bit data ($A_0 A_1$), comprises inverters 10 and 11 for outputting an output bit $P_0$ by buffering input bit $A_0$, a buffer 12 for outputting an output bit $P_1$ by buffering a low level signal, an inverter 13 for inverting the input bit $A_1$, a NOR gate 14 for outputting an output bit $P_2$ by performing a NOR operation of the output signals of the inverters 11 and 13 and a NOR gate 15 for outputting an output bit $P_3$ by performing a NOR operation of the output signals of the inverters 10 and 13.

Figure 4:
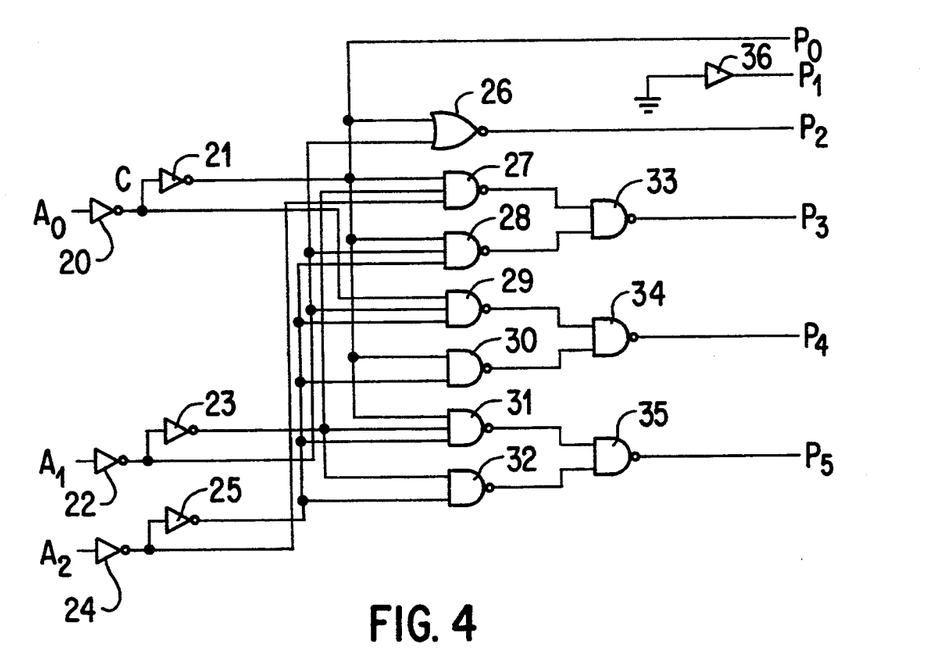
FIG. 4 shows a 3-bit square computation circuit.

The relationship for 3-bit data is induced as follows.

$$P_0 = A_0$$

$$P_1 = 0$$

$$P_2 = \overline{A_0} \vee \overline{A_1}$$

$$P_3 = \overline{(\overline{A_0 A_1 A_2})(\overline{A_0 A_1 A_2})}$$

$$P_4 = \overline{(\overline{A_0 A_1 A_2})(\overline{A_0 A_2})}$$

$$P_5 = \overline{(\overline{A_1 A_2})(\overline{A_0 A_1 A_2})}$$

FIG. 4 shows a 3-bit square computation circuit of the present invention in accordance with the above equations.

In FIG. 4, the 3-bit square computation circuit for outputting 6-bit data ($P_0 P_1 P_2 P_3 P_4 P_5$) by inputting 3-bit data ($A_0 A_1 A_2$) comprises inverters 20 and 21 for outputting an output bit $P_0$ by buffering an input bit $A_0$, inverters 22 and 23 for buffering an input bit $A_1$, inverters 24 and 25 for buffering an input $A_2$, a NOR gate 26 for performing a NOR-operation of the output signals of the inverters 21 and 22 and outputting an output bit $P_2$, a NAND gate 27 for performing a NAND-operation of the output signals of the inverters 21, 23 and 24, a NAND gate 28 for performing a NAND-operation of the output signals of the inverters 21, 22 and 25, a NAND gate 29 for performing a NAND-operation of the output signals of the inverters 20, 22 and 25, a NAND gate 30 for performing a NAND-operation of the output signals of the inverters 21 and 25, a NAND gate 31 for performing a NAND-operation of the output signals of the inverters 21, 23 and 25, a NAND gate 32 for performing a NAND-operation of the output signals of the inverters 23 and 25, a NAND gate 33 for performing a NAND-operation of the output signals of the NAND gates 27 and 28 and outputting an output bit $P_3$, a NAND gate 34 for performing a NAND-operation of the output signals of the NAND gates 29 and 30 and outputting an output bit $P_4$, a NAND gate 35 for performing a NAND-operation of the output signals of the NAND gates 31 and 32 and outputting an output bit $P_5$ and a buffer 36 for buffering a low level signal and outputting an output bit $P_1$.

Figure 5:
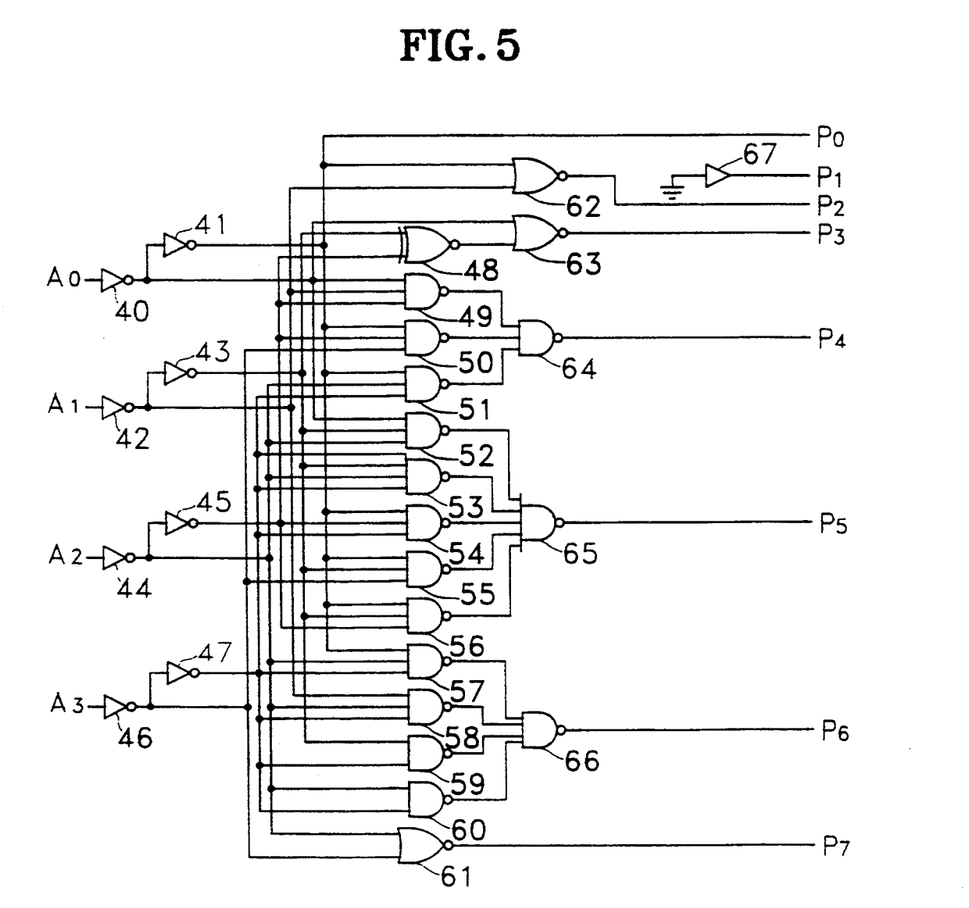
FIG. 5 shows a 4-bit square computation circuit.

The relationship for 4-bit data is induced as follows.

$$P_0 = A_0$$

$$P_1 = 0$$

$$P_2 = \overline{A_0} \vee \overline{A_1}$$

$$P_3 = \overline{A_0} \vee \overline{(A_1 \oplus A_2)}$$

$$P_4 = \overline{(\overline{A_0 A_1 A_2})(\overline{A_0 A_2 \overline{A_3}})(\overline{A_0 \overline{A_2} A_3})}$$

$$P_5 = \overline{(\overline{A_1 \overline{A_2} A_3})(\overline{A_0 A_1 \overline{A_2} A_3})(\overline{A_1 A_2 \overline{A_3}})(\overline{A_0 A_1 A_2})(\overline{A_0 A_2 A_3})}$$

$$P_6 = \overline{(\overline{A_0 \overline{A_2} A_3})(\overline{A_1 A_2 A_3})(\overline{A_0 A_1 A_2 A_3})(\overline{A_1 A_3})(\overline{A_0 A_1 A_3})(\overline{A_2 A_3})}$$

$$P_7 = \overline{\overline{A_2 A_3}}$$

$$= \overline{A_2} \vee \overline{A_3}$$

FIG. 5 shows a 4-bit data square computation circuit in accordance with the above equations.

In FIG. 5, the 4-bit data square computation circuit for outputting 8-bit data ($P_0P_1P_2P_3P_4P_5P_6P_7$) by inputting 4-bit data ($A_0A_1A_2A_3$) comprises inverters 40 and 41 for outputting an output bit $P_0$ by buffering an input bit $A_0$ inverters 42 and 43 for buffering an input bit $A_1$, inverters 44 and 45 for buffering an input $A_2$, inverters 46 and 47 for buffering an input bit $A_3$, an XNOR gate 48 for performing an XNOR-operation of the output signals of the inverters 43 and 45, a NAND gate 49 for performing a NAND-operation of the output signals of the inverters 40, 42 and 45, a NAND gate 50 for performing a NAND-operation of the output signals of the inverters 41, 45 and 46, a NAND gate 51 for performing a NAND-operation of the output signals of the inverters 41, 44 and 47, a NAND gate 52 for performing a NAND-operation of the output signals of the inverters 40, 43, 44 and 47, a NAND gate 53 for performing a NAND-operation of the output signals of the inverters 43, 44 and 47, a NAND gate 54 for performing a NAND-operation of the output signals of the inverters 41, 45 and 47, a NAND gate 55 for performing a NAND-operation of the output signals of the inverters 43, 45 and 46, a NAND gate 56 for performing a NAND-operation of the output signals of the inverters 41, 43 and 45, a NAND gate 57 for performing a NAND-operation of the output signals of the inverters 41, 44 and 47, a NAND gate 58 for performing a NAND-operation of the output signals of the inverters 42, 44 and 47 a NAND gate 59 for performing a NAND-operation of the output signals of the inverters 43 and 47, a NAND gate 60 for performing a NAND-operation of the output signals of the inverters 44 and 47, a NOR gate 61 for performing a NOR-operation of the output signals of the inverters 44 and 46 and outputting an output bit $P_7$, a NOR gate 62 for performing a NOR-operation of the output signals of the inverters 41 and 42 and outputting an output bit $P_2$, a NOR gate 63 for performing a NOR-operation of the output signals of the inverter 40 and the XNOR gate 48 and outputting an output bit $P_3$, a NAND gate 64 for performing a NAND-operation of the output signals of the NAND gates 49, 50 and 51 and outputting an output bit $P_4$, a NAND gate 65 for performing a NAND-operation of the output signals of the NAND gates 52, 53, 54, 55 and 56 and outputting an output bit $P_5$, a NAND gate 66 for performing a NAND-operation of the output signals of the NAND gates 57, 58, 59 and 60 and outputting an output bit $P_6$ and a buffer 67 for buffering a low level signal and outputting an output bit $P_1$.

Figure 6:
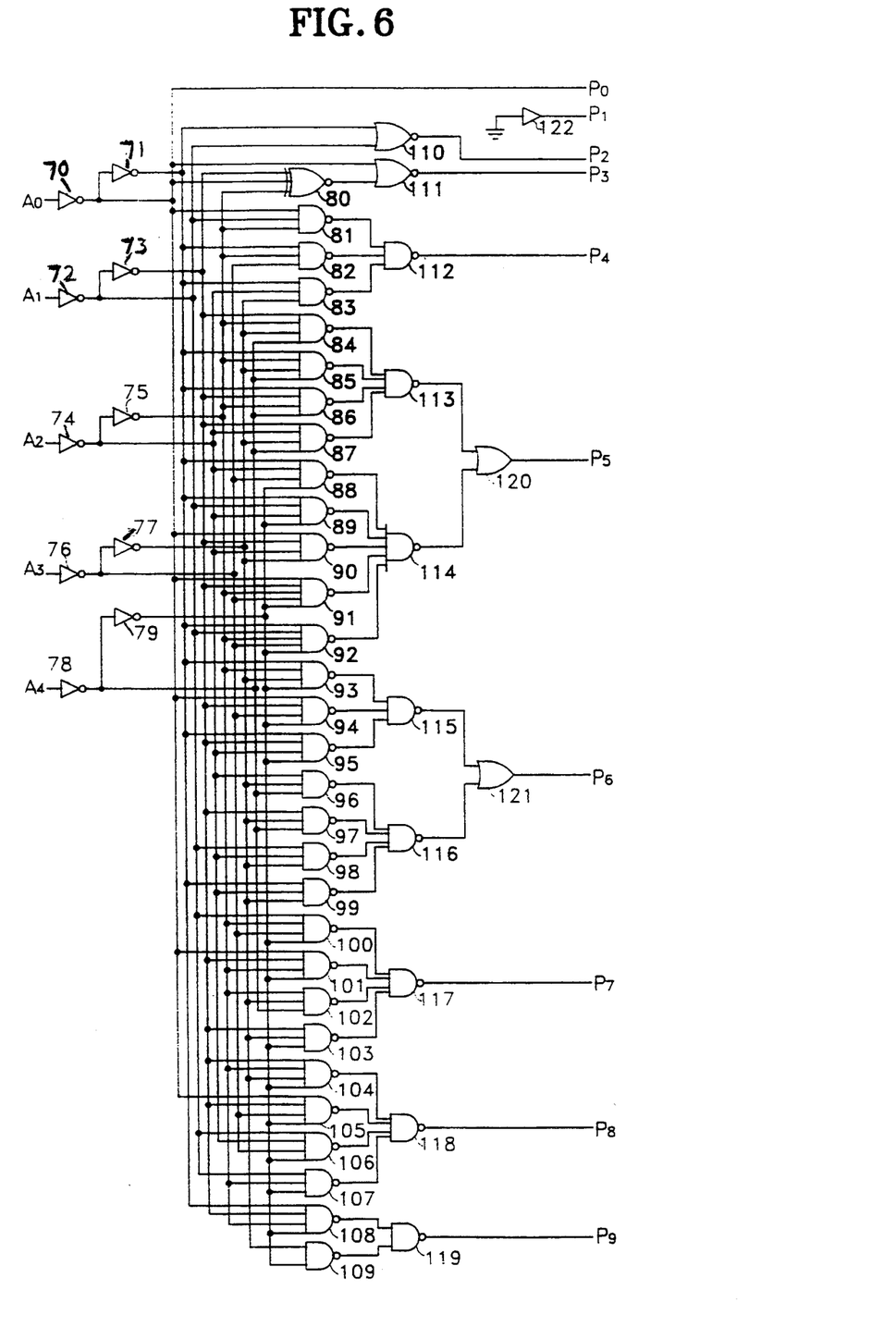
FIG. 6 shows a 5-bit square computation circuit.

The relationship for 5-bit data is induced as follows.

$$P_0 = A_0$$

$$P_1 = 0$$

$$P_2 = \overline{A_0} \vee \overline{A_1}$$

$$P_3 = \overline{A_0} \vee \overline{(A_1 \oplus A_2)}$$

$$P_4 = \overline{(\overline{A_0 A_1 A_2})(\overline{A_0 A_2 \overline{A_3}})(\overline{A_0 \overline{A_2} A_3})}$$

$$P_5 = \{\overline{(\overline{A_0 A_1 A_2 A_4})(\overline{A_0 A_2 \overline{A_3} A_4})(\overline{A_1 \overline{A_2} A_3 \overline{A_4}})} -$$
$$\overline{(\overline{A_0 A_1 \overline{A_2} A_3})}$$
$$\overline{(\overline{A_1 A_2 \overline{A_3} \overline{A_4}})(\overline{A_0 A_1 A_2 \overline{A_3} A_4})(\overline{A_0 A_1 A_2 \overline{A_4}})}$$
$$\overline{(\overline{A_0 A_2 A_3 \overline{A_4}})(\overline{A_0 \overline{A_1} A_2 \overline{A_3} A_4})}\}$$

$$P_6 = \overline{(\overline{A_0 A_1 \overline{A_3} A_4})(\overline{A_0 A_2 A_3})(\overline{A_1 \overline{A_2} A_3})(\overline{A_1 A_3 \overline{A_4}})}$$
$$\overline{(\overline{A_0 A_1 \overline{A_2} A_4})(\overline{A_2 A_3 \overline{A_4}})(\overline{A_0 A_2 A_3 A_4})}$$

$$P_7 = \overline{(\overline{A_0 A_1 A_2 A_4})(\overline{A_2 A_3 \overline{A_4}})(\overline{A_1 A_3 A_4})}$$
$$\overline{(\overline{A_1 A_2 A_3 A_4})}$$

$$P_8 = \overline{(\overline{A_1 A_2 A_3 A_4})(\overline{A_1 A_2 A_4})(\overline{A_1 A_2 A_3 A_4})(\overline{A_0 A_1 A_3 A_4})}$$

$$P_9 = \overline{(\overline{A_3 A_4})(\overline{A_0 A_1 A_2 A_4})}$$

FIG. 6 shows a 5-bit data square computation circuit in accordance with the above equations.

In FIG. 6, the 5-bit data square computation circuit for outputting 10-bit data ($P_0P_1P_2P_3P_4P_5P_6P_7P_8P_9$) by squaring 5-bit data ($A_0A_1A_2A_3A_4$) comprises inverters 70 and 71 for outputting an output bit $P_0$ by buffering an input bit $A_0$, inverters 72 and 73 for buffering an input bit $A_1$, inverters 74 and 75 for buffering an input $A_2$, inverters 76 and 77 for buffering an input $A_3$, inverters 78 and 79 for buffering an input $A_4$, an XNOR gate 80 for performing an XNOR-operation of the output signals of the inverters 73 and 75, a NAND gate 81 for performing a NAND-operation of the output signals of the inverters 70, 72 and 75, a NAND gate 82 for performing a NAND-operation of the output signals of the inverters 71, 75 and 76, a NAND gate 83 for performing a NAND-operation of the output signals of the inverters 71, 74 and 77, a NAND gate 84 for performing a NAND-operation of the output signals of the inverters 73, 75, 76 and 78, a NAND gate 85 for performing a NAND-operation of the output signals of the inverters 71, 75, 77 and 78, a NAND gate 86 for performing a NAND-operation of the output signals of the inverters 71, 73, 75 and 78, a NAND gate 87 for performing a NAND-operation of the output signals of the inverters 73, 74, 77 and 78, a NAND gate 88 for performing a NAND-operation of the output signals of the inverters 71, 74, 76 and 79, a NAND gate 89 for performing a NAND-operation of the output signals of the inverters 71, 72, 74 and 79, a NAND gate 90 for performing a NAND-operation of the output signals of the inverters 70, 73, 74 and 77, a NAND gate 91 for performing a NAND-operation of the output signals of the inverters 70, 73, 75, 76 and 79, a NAND gate 92 for performing a NAND-operation of the output signals of the inverters 71, 72, 75, 76 and 79, a NAND gate 93 for performing a NAND-operation of the output signals of the inverters 71, 75, 77 and 79, a NAND gate 94 for performing a NAND-operation of the output signals of the inverters 70, 73, 76 and 79, a NAND gate 95 for performing a NAND-operation of the output signals of the inverters 71, 73, 74 and 79, a NAND gate 96 for performing a NAND-operation of the output signals of the inverters 74, 77 and 78, a NAND gate 97 for performing a NAND-operation of the output signals of the inverters 73, 77 and 78, a NAND gate 98 for performing a NAND-operation of the output signals of the inverters 72, 74 and 77, a NAND gate 99 for performing a NAND-operation of the output signals of the inverters 71, 74 and 77, a NAND gate 100 for performing a NAND-operation of the output signals of the inverters 72, 75, 76 and 79, a NAND gate 101 for performing a NAND-operation of the output signals of the inverters 70, 73, 75 and 79, a NAND gate 102 for performing a NAND-operation of the output signals of the inverters 75, 77 and 78, a NAND gate 103 for performing a NAND-operation of the output signals of the inverters 73, 77 and 79, a NAND gate 104 for performing a NAND-operation of the output signals of the inverters 73, 75, 77 and 79, a NAND gate 105 for performing a NAND-operation of the output signals of the inverters 70, 73, 76 and 79, a NAND gate 106 for performing a NAND-operation of the output signals of the inverters 72, 74, 76 and 79, a NAND gate 107 for performing a NAND-operation of the output signals of the inverters 72, 75 and 79, a NAND gate 108 for performing a NAND-operation of the output signals of the inverters 71, 73, 75 and 79, a NAND gate 109 for performing a NAND-operation of the output signals of the inverters 77 and 79, a NOR gate 110 for performing a NOR-operation of the output signals of the inverters 71 and 72 and outputting an output bit $P_2$, a NOR gate 111 for performing a NOR-operation of the output signals of the inverter 70 and the XNOR gate 80 and outputting an output bit $P_3$, a NAND gate 112 for performing a NAND-operation of the output signals of the NAND gates 81, 82 and 83 and outputting an output bit $P_4$, a NAND gate 113 for performing a NAND-operation of the output signals of the NAND gates 84, 85, 86 and 87, a NAND gate 114 for performing a NAND-operation of the output signals of the NAND gates 88, 89, 90, 91 and 92, a NAND gate 115 for performing a NAND-operation of the output signals of the NAND gates 93, 94 and 95, a NAND gate 116 for performing a NAND-operation of the output signals of the NAND gates 96, 97, 98 and 99, a NAND gate 117 for performing a NAND-operation of the output signals of the NAND gates 100, 101, 102 and 103 and outputting an output bit $P_7$, a NAND gate 118 for performing a NAND-operation of the output signals of the NAND gates 104, 105, 106 and 107 and outputting an output bit $P_8$, a NAND gate 119 for performing a NAND-operation of the output signals of the NAND gates 108 and 109 and outputting an output bit $P_9$, an OR gate 120 for performing an OR-operation of the output signals of the NAND gates 113 and 114 and outputting an output signal $P_5$, an OR gate 121 for performing an OR-operation of the output signals of the NAND gates 115 and 116 and outputting an output signal $P_6$ and a buffer 122 for inputting and buffering ground voltage and outputting an output bit $P_1$.

Figure 7A:
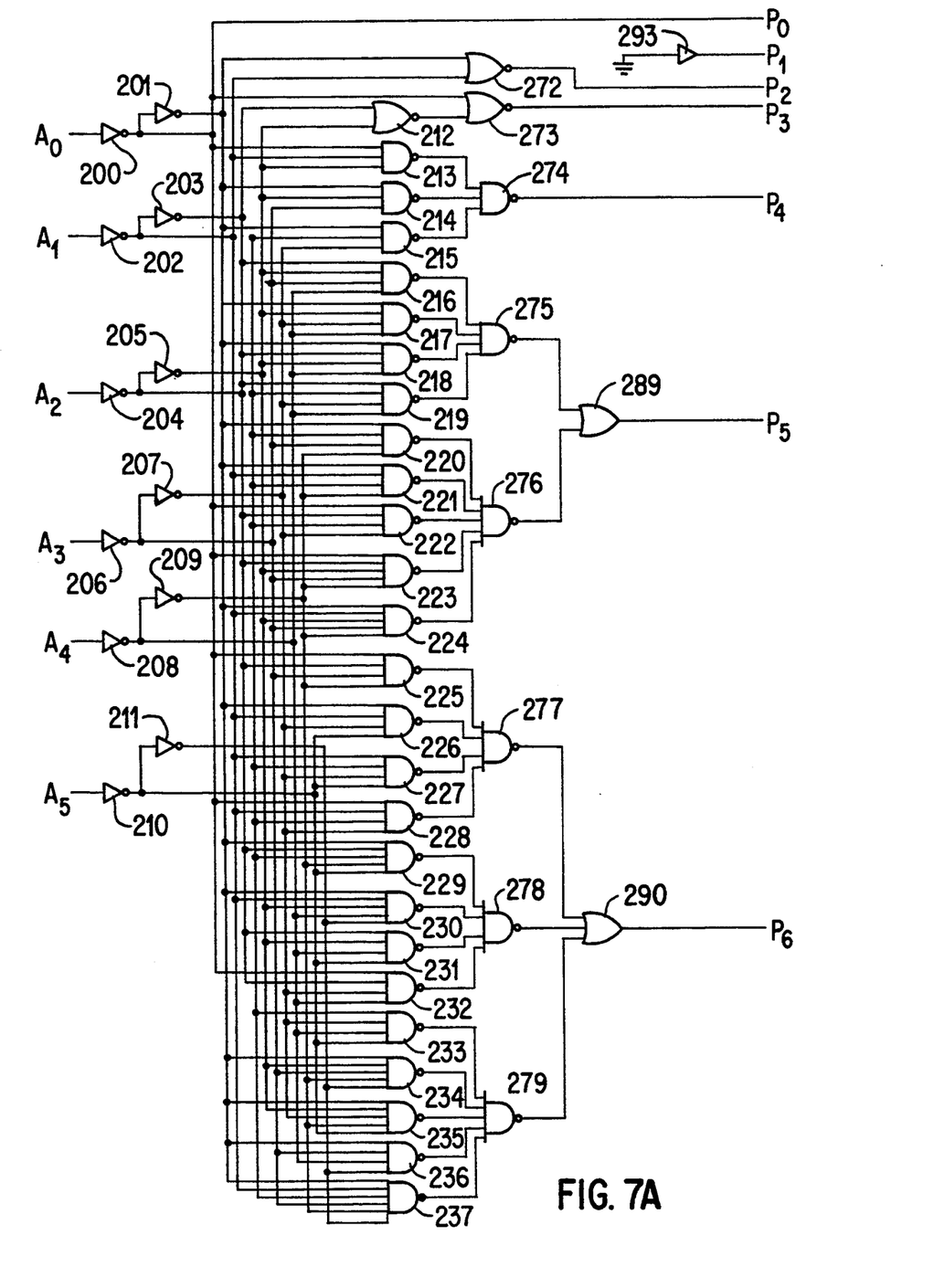
FIGS. 7A and 7B together show a 6-bit square computation circuit.
Figure 7B:
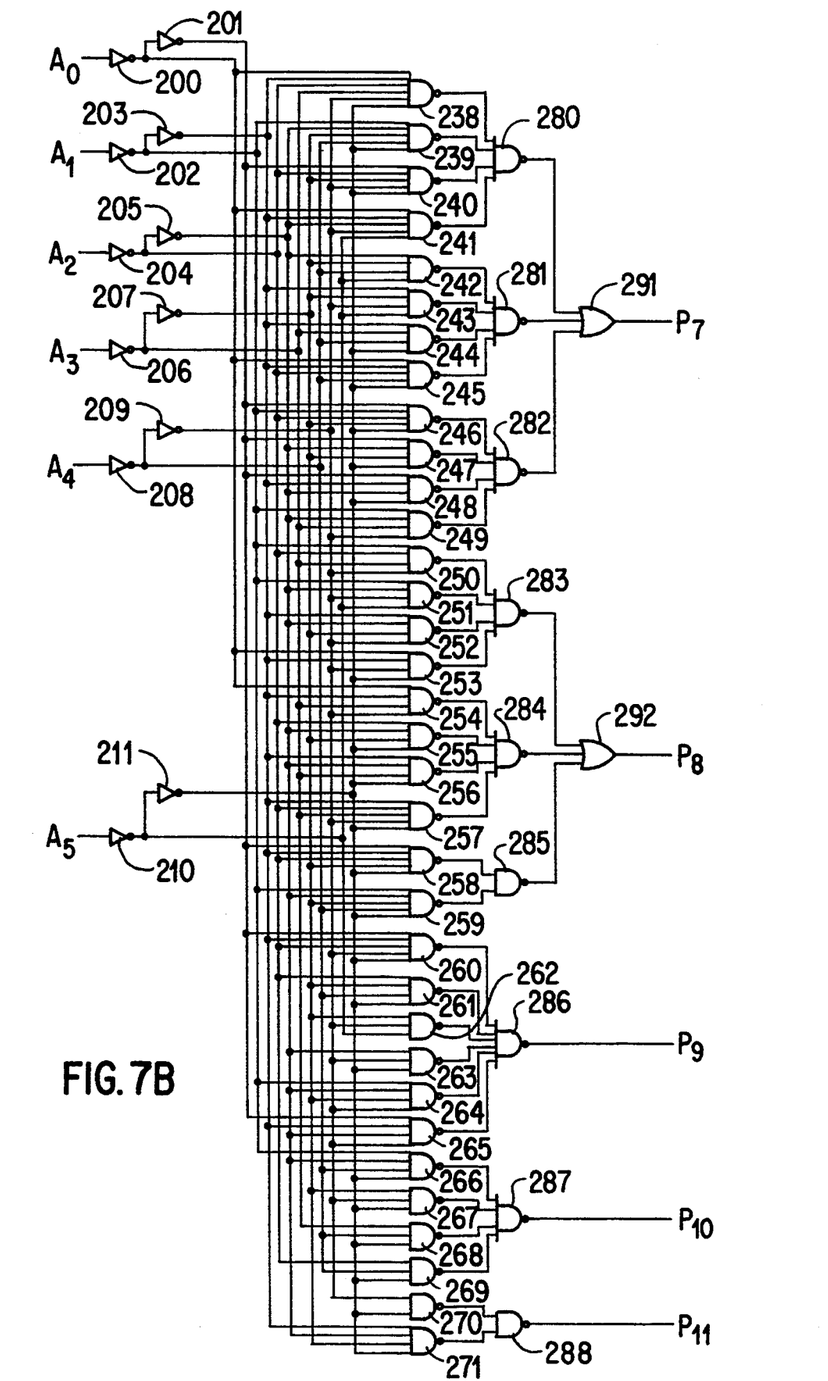

The relationship for 6-bit data is induced as follows.

$$P_0 = A_0$$

$$P_1 = 0$$

$$P_2 = \overline{A_0}A_1$$

$$P_3 = A_0(A_1 \oplus A_2)$$

$$P_4 = \overline{A_0}\overline{A_1}A_2 \vee A_0 A_2 \overline{A_3} \vee A_0 \overline{A_2} A_3$$

$$P_5 = A_0\overline{A_1}\overline{A_2}A_4 \vee A_0\overline{A_2}\overline{A_3}A_4 \vee A_1\overline{A_2}A_3\overline{A_4} \vee \overline{A_0}A_1\overline{A_2}A_3 \vee A_1\overline{A_2}\overline{A_3}\overline{A_4} \vee \overline{A_0}A_1A_2\overline{A_3}A_4 \vee A_0 A_1 A_2 \overline{A_4} \vee A_0 A_2 A_3 \overline{A_4} \vee A_0 \overline{A_1} A_2 \overline{A_3} A_4$$

$$P_6 = \overline{A_0}\overline{A_1}\overline{A_3}A_4 \vee \overline{A_0}\overline{A_2}A_3\overline{A_5} \vee \overline{A_1}\overline{A_2}A_3\overline{A_5} \vee \overline{A_0}\overline{A_1}\overline{A_2}A_3 \vee A_0\overline{A_1}\overline{A_2}A_4 A_5 \vee A_0\overline{A_1}\overline{A_2}A_4 A_5 \vee A_1 A_3 \overline{A_4} A_5 \vee \overline{A_0}A_1\overline{A_3}A_4 \vee A_2 A_3 \overline{A_4} A_5 \vee A_0 A_2 \overline{A_3} A_4 A_5 \vee A_0 A_2 A_3 A_4 \overline{A_5} \vee A_0 \overline{A_3}\overline{A_4} A_5 \vee A_0\overline{A_1}\overline{A_2}\overline{A_3}A_4 A_5$$

$$P_7 = \overline{A_0}\overline{A_1}\overline{A_2}\overline{A_3}A_4 A_5 \vee \overline{A_1}A_2 A_3\overline{A_4}A_5 \vee A_0\overline{A_2}A_3 A_4 A_5 \vee \overline{A_0}A_1\overline{A_2}A_4\overline{A_5} \vee A_2 A_3 \overline{A_4}\overline{A_5} \vee A_1 A_3 A_4 \overline{A_5} \vee A_1\overline{A_3}\overline{A_4}A_5 \vee \overline{A_0}\overline{A_1}\overline{A_2}A_4 A_5 \vee A_0\overline{A_1}\overline{A_2}A_3 A_5 \vee A_0\overline{A_2}A_3 A_5 \vee A_0 A_1 A_2 A_5 \vee \overline{A_1}A_2\overline{A_3}A_4$$

$$P_8 = \overline{A_1}\overline{A_2}A_3\overline{A_4} \vee \overline{A_1}A_2 A_3\overline{A_4}\overline{A_5} \vee A_1 A_2 A_3 A_4 \vee \overline{A_0}A_1 A_4 A_5 \vee \overline{A_0}A_1\overline{A_3}A_4 \vee A_2\overline{A_3}\overline{A_4}A_5 \vee A_1 A_2\overline{A_3}A_5 \vee A_1 A_2 \overline{A_3} A_5 \vee \overline{A_1}A_2 A_3\overline{A_4}A_5 \vee A_0\overline{A_1}\overline{A_2}A_3 A_5 \vee \overline{A_1}A_2 A_3\overline{A_4}A_5$$

$$P_9 = A_0\overline{A_1}\overline{A_2}\overline{A_3}A_4 A_5 \vee \overline{A_2}A_3\overline{A_4}A_5 \vee A_3 A_4 \overline{A_5} \vee A_2 A_4 A_5 \vee \overline{A_1}A_2 A_3 A_5 \vee A_0 A_1 A_2 A_4$$

$$P_{10} = \overline{A_1}A_2\overline{A_4}A_5 \vee A_3 A_4 A_5 \vee \overline{A_3}\overline{A_4}A_5 \vee \overline{A_2}\overline{A_4}A_5$$

$$P_{11} = A_4 A_5 \vee A_1 A_2 A_3 A_5$$

To simplify the circuit, the above equations are readjusted as follows.

$$P_0 = A_0$$

$$P_1 = 0$$

$$P_2 = \overline{\overline{A_0} \vee \overline{A_1}}$$

$$P_3 = \overline{\overline{A_0} \vee \overline{A_1 \oplus A_2}}$$

$$P_4 = \overline{(\overline{A_0}\overline{A_1}A_2)(A_0 A_2\overline{A_3})(A_0\overline{A_2}A_3)}$$

$$P_5 = \overline{\{(A_0\overline{A_1}\overline{A_2}A_4)(A_0\overline{A_2}\overline{A_3}A_4)(A_1\overline{A_2}A_3\overline{A_4})}$$
$$\overline{(\overline{A_0}A_1\overline{A_2}A_3)(A_1\overline{A_2}\overline{A_3}\overline{A_4})(\overline{A_0}A_1 A_2\overline{A_4})}$$
$$\overline{(A_0 A_1 A_2\overline{A_4})(A_0 A_2 A_3\overline{A_4})(A_0\overline{A_1} A_2 A_3 A_4)\}}$$

$$P_6 = \overline{\{(\overline{A_0}\overline{A_1}\overline{A_3}A_4)(\overline{A_0}\overline{A_2}A_3\overline{A_5})(\overline{A_1}\overline{A_2}A_3 A_5)}$$
$$\overline{(\overline{A_0}\overline{A_1}\overline{A_2}A_3)(A_0\overline{A_1}\overline{A_2}A_4 A_5)(A_0\overline{A_1}A_2\overline{A_4}A_5)}$$
$$\overline{(A_1 A_3\overline{A_4}A_5)(\overline{A_0}A_1\overline{A_3}A_4)(A_2 A_3\overline{A_4}A_5)}$$
$$\overline{(A_0 A_2\overline{A_3}A_4 A_5)(A_0 A_2 A_3 A_4\overline{A_5})(A_0\overline{A_3}\overline{A_4}A_5)(A_0\overline{A_1}\overline{A_2}\overline{A_3}A_4 A_5)\}}$$

$$P_7 = \overline{\{(\overline{A_0}\overline{A_1}\overline{A_2}\overline{A_3}A_4 A_5)(\overline{A_1}A_2 A_3\overline{A_4}A_5)(A_0\overline{A_2}A_3 A_4 A_5)}$$
$$\overline{(\overline{A_0}A_1\overline{A_2}A_4\overline{A_5})(A_2 A_3\overline{A_4}\overline{A_5})(A_1 A_3 A_4\overline{A_5})(A_1\overline{A_3}\overline{A_4}A_5)}$$
$$\overline{(\overline{A_0}\overline{A_1}\overline{A_2}A_4 A_5)(A_0\overline{A_1}\overline{A_2}A_3 A_5)(A_0\overline{A_2}A_3 A_5)}$$
$$\overline{(A_0 A_1 A_2 A_5)(\overline{A_1}A_2\overline{A_3}A_4)\}}$$

$$P_8 = \overline{\{(\overline{A_1}\overline{A_2}A_3\overline{A_4})(\overline{A_1}A_2 A_3\overline{A_4}\overline{A_5})(\overline{A_1}A_2 A_3 A_4)}$$
$$\overline{(\overline{A_0}A_1 A_4 A_5)(\overline{A_0}A_1\overline{A_3}A_4)(A_2\overline{A_3}\overline{A_4}A_5)(A_1 A_2\overline{A_3}A_5)}$$
$$\overline{(A_1\overline{A_2}A_3 A_4 A_5)(A_0\overline{A_1}\overline{A_2}A_3 A_5)(\overline{A_1}A_2 A_3\overline{A_4}A_5)\}}$$

$$P_9 = \overline{(A_0\overline{A_1}\overline{A_2}\overline{A_3}A_4 A_5)(\overline{A_2}A_3\overline{A_4}A_5)(A_3 A_4\overline{A_5})}$$
$$\overline{(A_2 A_4 A_5)(\overline{A_1}A_2 A_3 A_5)(A_0 A_1 A_2 A_4)}$$

$$P_{10} = \overline{(\overline{A_1}A_2\overline{A_4}A_5)(A_3 A_4 A_5)(\overline{A_3}\overline{A_4}A_5)(\overline{A_2}\overline{A_4}A_5)}$$

$$P_{11} = \overline{'(A_4A_5)(A_1A_2A_3A_4)}$$

FIG. 7 shows a 6-bit data square computation circuit in accordance with the above equations.

In FIG. 7, the 6-bit data square computation circuit for outputting 12-bit data $(P_0P_1P_2P_3P_4P_5P_6P_7P_8P_9P_{10}P_{11})$ by squaring 6-bit data $(A_0A_1A_2A_3A_4A_5)$, comprises inverters 200 and 201 for outputting an output bit $P_0$ by buffering an input bit $A_0$, inverters 202 and 203 for buffering an input bit $A_1$, inverters 204 and 205 for buffering an input $A_2$, inverters 206 and 207 for buffering an input $A_3$, inverters 208 and 209 for buffering an input $A_4$, inverters 210 and 211 for buffering an input $A_5$, an XNOR gate 212 for performing an XNOR-operation of the output signals of the inverters 203 and 205, a NAND gate 213 for performing a NAND-operation of the output signals of the inverters 200, 202 and 205, a NAND gate 214 for performing a NAND-operation of the output signals of the inverters 201, 205 and 206, a NAND gate 215 for performing a NAND-operation of the output signals of the inverters 201, 204 and 207, a NAND gate 216 for performing a NAND-operation of the output signals of the inverters 203, 205, 206 and 208, a NAND gate 217 for performing a NAND-operation of the output signals of the inverters 201, 205, 207 and 208, a NAND gate 218 for performing a NAND-operation of the output signals of the inverters 201, 203, 205 and 208, a NAND gate 219 for performing a NAND-operation of the output signals of the inverters 203, 204, 207 and 208, a NAND gate 220 for performing a NAND-operation of the output signals of the inverters 201, 204, 206 and 209, a NAND gate 221 for performing a NAND-operation of the output signals of the inverters 201, 202, 204 and 209, a NAND gate 222 for performing a NAND-operation of the output signals of the inverters 200, 203, 204 and 207, a NAND gate 223 for performing, a NAND-operation of the output signals of the inverters 200, 203, 205, 206 and 209, a NAND gate 224 for performing a NAND-operation of the output signals of the inverters 201, 202, 205, 206 and 209, a NAND gate 225 for performing a NAND-operation of the output signals of the inverters 200, 203, 206 and 209, a NAND gate 226 for performing a NAND-operation of the output signals of the inverters 201, 202, 207 and 210, a NAND gate 227 for performing a NAND-operation of the output signals of the inverters 202, 204, 207 and 210, a NAND gate 228 for performing a NAND-operation of the output signals of the inverters 200, 202, 204 and 207, a NAND gate 229 for performing a NAND-operation of the output signals of the inverters 201, 203, 204, 209 and 210, a NAND gate 230 for performing a NAND-operation of the output signals of the inverters 201, 202, 205, 208 and 211, a NAND gate 231 for performing a NAND-operation of the output signals of the inverters 203, 205, 208 and 210, a NAND gate 232 for performing a NAND-operation of the output signals of the inverters 200, 203, 207 and 208, a NAND gale 233 for performing a NAND-operation of the output signals of the inverters 204, 207, 208 and 210, a NAND gate 234 for performing a NAND-operation of the output signals of the inverters 201, 205, 206, 209 and 211, a NAND gate 235 for performing a NAND-operation of the output signals of the inverters 201, 205, 207, 209 and 210, a NAND gate 236 for performing a NAND-operation of the output signals of the inverters 201 206, 208 and 211 a NAND gate 237 for performing a NAND-operation of the output signals of the inverters 201, 202, 204, 206, 209 and 211, a NAND gate 238 for performing a NAND-operation of the output signals of the inverters 200, 203, 204, 206, 209 and 211, a NAND gate 239 for performing a NAND-operation of the output signals of the inverters 202, 205, 207, 208 and 211, a NAND gate 240 for performing a NAND-operation of the output signals of the inverters 201, 204, 207, 209 and 211, a NAND gate 241 for performing a NAND-operation of the output signals of the inverters 200, 203, 205, 209 and 210, a NAND gate 242 for performing a NAND-operation of the output signals of the inverters 205, 207, 208 and 210, a NAND gate 243 for performing a NAND-operation of the output signals of the inverters 203, 207, 209 and 210, a NAND gate 244 for performing a NAND-operation of the output signals of the inverters 203, 206, 208 and 211, a NAND gate 245 for performing a NAND-operation of the output signals of the inverters 200, 203, 204, 208 and 211, a NAND gate 246 for performing a NAND-operation of the output signals of the inverters 201, 202, 204, 207 and 211, a NAND gate 247 for performing a NAND-operation of the output signals of the inverters 201, 205, 207 and 211, a NAND gate 248 for performing a NAND-operation of the output signals of the inverters 201, 203, 205 and 211, a NAND gate 249 for performing a NAND-operation of the output signals of the inverters 202, 205, 206 and 209, a NAND gate 250 for performing a NAND-operation of the output signals of the inverters 202, 204, 206 and 209, a NAND gate 251 for performing a NAND-operation of the output signals of the inverters 202, 205, 209 and 210, a NAND gate 252 for performing a NAND-operation of the output signals of the inverters 203, 205, 207 and 209, a NAND gate 253 for performing a NAND-operation of the output signals of the inverters 200, 203, 209 and 211, a NAND gate 254 for performing a NAND-operation of the output signals of the inverters 200, 203, 206 and 209, a NAND gate 255 for performing a NAND-operation of the output signals of the inverters 205, 206, 208 and 211, a NAND gate 256 for performing a NAND-operation of the output signals of the inverters 203, 205, 206 and 211, a NAND gate 257 for performing a NAND-operation of the output signals of the inverters 203, 204, 206, 209 and 211, a NAND gate 258 for performing a NAND-operation of the output signals of the inverters 201, 203, 204, 207 and 211, a NAND gate 259 for performing a NAND-operation of the output signals of the inverters 202, 205, 207, 208 and 211, a NAND gate 260 for performing a NAND-operation of the output signals of the inverters 201, 203, 204, 209 and 211, a NAND gate 261 for performing a NAND-operation of the output signals of the inverters 204, 207, 208 and 211, a NAND gate 262 for performing a NAND-operation of the output signals of the inverters 207, 209, and 210, a NAND gate 263 for performing a NAND-operation of the output signals of the inverters 205, 209 and 211, a NAND gate 264 for performing a NAND-operation of the output signals of the inverters 202, 205, 207 and 211, a NAND gate 265 for performing a NAND-operation of the output signals of the inverters 201, 203, 205 and 209, a NAND gate 266 for performing a NAND-operation of the output signals of the inverters 202, 205, 208 and 211, a NAND gate 267 for performing a NAND-operation of the output signals of the inverters 207, 209 and 211, a NAND gate 268 for performing a NAND-operation of the output signals of the inverters 206, 208 and 211, a NAND gate 269 for performing a NAND-operation of the output signals of the inverters 204, 208 and 211, a NAND gate 270 for performing a NAND-operation of the output signals of the inverters 209 and 211, a NAND gate 271 for performing a NAND-operation of the output signals of the inverters 203, 205, 207 and 211, a NOR gate 272 for performing a NOR-operation of the output signals of the inverters 201 and 202 and outputting an output bit $P_2$, a NOR gate 273 for performing a NOR-operation of the output signals of the inverter 200 and the XNOR gate 212 and outputting an output bit $P_3$, a NAND gate 274 for performing a NAND-operation of the output signals of the NAND gates 213, 214 and 215, a NAND gate 275 for performing a NAND-operation of the output signals of the NAND gates 216, 217, 218 and 219, a NAND gate 276 for performing a NAND-operation of the output signals of the NAND gates 220, 221, 222, 223, and 224, a NAND gate 277 for performing a NAND-operation of the output signals of the NAND gates 225, 226, 227 and 228, a NAND gate 278 for performing a NAND-operation of the output signals of the NAND gates 229, 230, 231 and 232, a NAND gate 279 for performing a NAND-operation of the output signals of the NAND gates 233, 234, 235, 236 and 237, a NAND gate 280 for performing a NAND-operation of the output signals of the NAND gates 238, 239, 240 and 241, a NAND gate 281 for performing a NAND-operation of the output signals of the NAND gates 242, 243, 244 and 245, a NAND gate 282 for performing a NAND-operation of the output signals of the NAND gates 246, 247, 248 and 249, a NAND gate 283 for performing a NAND-operation of the output signals of the NAND gates 250, 251, 252 and 253, a NAND gate 284 for performing a NAND-operation of the output signals of the NAND gates 254, 255, 256 and 257, a NAND gate 285 for performing a NAND-operation of the output signals of the NAND gates 258 and 259, a NAND gate 286 for performing a NAND-operation of the output signals of the NAND gates 260, 261, 262, 263, 264 and 265, a NAND gate 287 for performing a NAND-operation of the output signals of the NAND gates 266, 267, 268 and 269, a NAND gate 288 for performing a NAND-operation of the output signals of the NAND gates 270 and 271, an OR gate 289 for performing an OR-operation of the output signals of the NAND gates 275 and 276 and outputting an output signal $P_5$, an OR gate 290 for performing an OR-operation of the output signals of the NAND gates 277, 278 and 279 and outputting an output signal $P_6$, an OR gate 291 for performing an OR-operation of the output signals of the NAND gates 280, 281 and 282 and outputting an output signal $P_7$, an OR gate 292 for performing an OR-operation of the output signals of the NAND gates 283, 284 and 285 and outputting an output signal $P_8$, and a buffer 293 for inputting and buffering ground voltage and outputting an output bit $P_1$.

Therefore, the use of the square computation circuit according to the present invention, instead of a multiplier as in the conventional square computation method, can improve operating speed and simplify the circuitry.

What is claimed is:

1. A square computation circuit for squaring 2-bit input data $A_1A_0$, comprising:

first and second inverters for outputting an output bit $P_0$ by buffering input bit $A_0$;
a buffer for outputting an output bit $P_1$ by buffering a low level signal;
a third inverter for inverting input bit $A_1$;
a first NOR gate for outputting an output bit $P_2$ by performing a NOR operation of the output signals of said second and third inverters; and
a second NOR gate for outputting an output bit $P_3$ by performing a NOR operation of the output signals of said first and third inverters.

2. A square computation circuit for squaring 3-bit input data $A_2A_1A_0$ comprising:

first and second inverters for outputting an output bit $P_0$ by buffering input bit $A_0$;
third and fourth inverters for buffering input bit $A_1$;
fifth and sixth inverters for buffering input bit $A_2$;
a first NOR gate for performing a NOR-operation of the output signals of said second and third inverters and outputting an output bit $P_2$;
a first NAND gate for performing a NAND-operation of the output signals of said second, fourth and fifth inverters;
a second NAND gate for performing a NAND-operation of the output signals of said second, third and sixth inverters;
a third NAND gate for performing a NAND-operation of the output signals of said first, third and sixth inverters;
a fourth NAND gate for performing a NAND-operation of the output signals of said second and sixth inverters;
a fifth NAND gate for performing a NAND-operation-of the output signals of said second, fourth and sixth inverters;
a sixth NAND gate for performing a NAND-operation of the output signals of said fourth and sixth inverters;
a seventh NAND gate for performing a NAND-operation of the output signals of said first and second NAND gates and outputting an output bit $P_3$;
an eighth NAND gate for performing a NAND-operation of the output signals of said third and fourth NAND gates and outputting an output bit $P_4$;
a ninth NAND gate for performing a NAND-operation of the output signals of said fifth and sixth NAND gates and outputting an output bit $P_5$; and
a buffer for buffering a low level signal and outputting an output bit $P_1$.

3. A square computation circuit for squaring 4-bit input data $A_3A_2A_1A_0$ comprising:

first and second inverters for outputting an output bit $P_0$ by buffering input bit $A_0$;
third and fourth inverters for buffering input bit $A_1$;
fifth and sixth inverters for buffering input bit $A_2$;
seventh and eighth inverters for buffering input $A_3$;
an XNOR gate for performing an XNOR-operation of the output signals of said fourth and sixth inverters;
a first NAND gate for performing a NAND-operation of the output signals of said first, third and sixth inverters;
a second NAND gate for performing a NAND-operation of the output signals of said second, sixth and seventh inverters;
a third NAND gate for performing a NAND-operation of the output signals of said second, fifth and eighth inverters;
a fourth NAND gate for performing a NAND-operation of the output signals of said first, fourth, fifth and eighth inverters;

a fifth NAND gate for performing a NAND-operation of the output signals of said fourth, fifth and eighth inverters;

a sixth NAND gate for performing a NAND-operation of the output signals of said second, sixth and eighth inverters;

a seventh NAND gate for performing a NAND-operation of the output signals of said fourth, sixth and seventh inverters;

an eighth NAND gate for performing a NAND-operation of the output signals of said second, fourth and sixth inverters;

a ninth NAND gate for performing a NAND-operation of the output signals of said second, fifth and eighth inverters;

a tenth NAND gate for performing a NAND-operation of the output signals of said third, fifth and eighth inverters;

an eleventh NAND-operation of the output signals of said fourth and eighth inverters;

a twelfth NAND gate for performing a NAND-operation of the output signals of said fifth and eighth inverters;

a first NOR gate for performing a NOR-operation of the output signals of said fifth and seventh inverters and outputting an output bit $P_7$;

a second NOR gate for performing a NOR-operation of the output signals of said second and third inverters and outputting an output bit $P_2$;

a third NOR gate for performing a NOR-operation of the output signals of said first inverter and said XNOR gate and outputting an output bit $P_3$;

a thirteenth NAND gate for performing a NAND-operation of the output signals of said first, second and third NAND gates and outputting an output bit $P_4$;

a fourteenth NAND gate for performing a NAND-operation of the output signals of said fourth, fifth, sixth and seventh, and eighth NAND gates and outputting an output bit $P_5$;

a fifteenth NAND gate for performing a NAND-operation of the output signals of said ninth, tenth, eleventh and twelfth NAND gates and outputting an output bit $P_6$; and a buffer for buffering a low level signal and outputting an output bit $P_1$.

4. A square computation circuit for squaring 5-bit input data $A_4A_3A_2A_1A_0$ comprising:

first and second inverters for outputting an output bit $P_0$ by buffering input bit $A_0$;

third and fourth inverters for buffering input bit $A_1$;

fifth and sixth inverters for buffering input bit $A_2$;

seventh and eighth inverters for buffering input bit $A_3$;

ninth and tenth inverters for buffering input bit $A_4$;

an XNOR gate for performing an XNOR-operation of the output signals of said fourth and sixth inverters;

a first NAND gate for performing a NAND-operation of the output signals of said first, third and sixth inverters;

a second NAND gate for performing a NAND-operation of the output signals of said second, sixth and seventh inverters;

a third NAND gate for performing a NAND-operation of the output signals of said second, fifth and eighth inverters;

a fourth NAND gate for performing a NAND-operation of the output signals of fourth, sixth, seventh and ninth inverters;

a fifth NAND gate for performing a NAND-operation of the output signals of said second, sixth, eighth and ninth inverters;

a sixth NAND gate for performing a NAND-operation of the output signals of said second, fourth, sixth and ninth inverters;

a seventh NAND gate for performing a NAND-operation of the output signals of said fourth, fifth, eighth and ninth inverters;

an eighth NAND gate for performing a NAND-operation of the output signals of said second, fifth, seventh and tenth inverters;

a ninth NAND gale for performing a NAND-operation of the output signals of said second, third, fifth and tenth inverters;

a tenth NAND gate for performing a NAND-operation of the output signals of said first, fourth, fifth and eighth inverters; an eleventh NAND gate for performing a NAND-operation of the output signals of said first, fourth, sixth, seventh and tenth inverters;

a twelfth NAND gate for performing a NAND-operation of the output signals of said second, third, sixth, seventh and tenth inverters;

a thirteenth NAND gate for performing a NAND-operation of the output signals of said second, sixth, eighth and tenth inverters;

a fourteenth NAND gate for performing a NAND-operation of the output signals of said first, fourth, seventh and tenth inverters;

a fifteenth NAND gate for performing a NAND-operation of the output signals of said second, fourth, fifth and tenth inverters;

a sixteenth NAND gate for performing a NAND-operation of the output signals of said fifth, eighth and ninth inverters;

a seventeenth NAND gate for performing a NAND-operation of the output signals of said fourth, eighth and ninth inverters;

an eighteenth NAND gate for performing a NAND-operation of the output signals of said third, fifth and eighth inverters;

a nineteenth NAND gate for performing a NAND-operation of the output signals of said second, fifth and eighth inverters;

a twentieth NAND gate for performing a NAND-operation of the output signals of said third, sixth, seventh and tenth inverters;

a twenty-first NAND gate for performing a NAND-operation of the output signals of said first, fourth, sixth and tenth inverters;

a twenty-second NAND gate for performing a NAND-operation of the output signals of said sixth, eighth and ninth inverters;

a twenty-third NAND gate for performing a NAND-operation of the output signals of said fourth, eighth and tenth inverters;

a twenty-fourth NAND gate for performing a NAND-operation of the output signals of said fourth, sixth, eighth and tenth inverters;

a twenty-fifth NAND gate for performing a NAND-operation of the output signals of said first, fourth, seventh and tenth inverters;

a twenty-sixth NAND gate for performing a NAND-operation of the output signals of said third, fifth, seventh and tenth inverters;

a twenty-seventh NAND gate for performing a NAND-operation of the output signals of said third, sixth and tenth inverters;

a twenty-eighth NAND gate for performing a NAND-operation of the output signals of said second, fourth, sixth and tenth inverters;

a twenty-ninth NAND gate for performing a NAND-operation of the output signals of said eighth and tenth inverters;

a first NOR gate for performing a NOR-operation of the output signals of said second and third inverters and outputting an output bit $P_2$;

a second NOR gate for performing a NOR-operation of the output signals of said first inverter and said XNOR gate, and outputting an output bit $P_3$;

a thirtieth NAND gate for performing a NAND-operation of the output signals of said first, second and third NAND gates and outputting an output bit $P_4$;

a thirty-first NAND gate for performing a NAND-operation of the output signals of said fourth, fifth, sixth and seventh NAND gates;

a thirty-second NAND gate for performing a NAND-operation of the output signals of said eighth, ninth, tenth, eleventh and twelfth NAND gates;

a thirty-third NAND gate for performing a NAND-operation of the output signals of said thirteenth, fourteenth and fifteenth NAND gates;

a thirty-fourth NAND gate for performing a NAND-operation of the output signals of said sixteenth, seventeenth, eighteenth and nineteenth NAND gates;

a thirty-fifth NAND gate for performing a NAND-operation of the output signals of said twentieth, twenty-first, twenty-second and twenty-third NAND gates and outputting an output bit $P_7$;

a thirty-sixth NAND gate for performing a NAND-operation of the output signals of said twenty-fourth, twenty-fifth, twenty-sixth and twenty-seventh NAND gates and outputting an output bit $P_8$;

a thirty-seventh NAND gate for performing a NAND-operation of the output signals of said twenty-eighth and twenty-ninth NAND gates and outputting an output bit $P_9$;

a first OR gate for performing an OR-operation of the output signals of said thirty-first and thirty-second NAND gates and outputting an output signal $P_5$;

a second OR gate for performing an OR-operation of the output signals of said thirty-third and thirty-fourth NAND gates and outputting an output signal $P_6$; and a buffer for inputting and buffering ground voltage and outputting an output bit $P_1$.

5. A square computation circuit for squaring 6-bit input data $A_5A_4A_3A_2A_1A_0$ comprising:

first and second inverters for outputting an output bit $P_0$ by buffering input bit $A_0$;

third and fourth inverters for buffering input bit $A_1$;

fifth and sixth inverters for buffering input bit $A_2$;

seventh and eighth inverters for buffering input bit $A_3$;

ninth and tenth inverters for buffering input bit $A_4$;

eleventh and twelfth inverters for buffering input bit $A_5$;

an XNOR gate for performing an XNOR-operation of the output signals of said fourth and sixth inverters;

a first NAND gate for performing a NAND-operation of the output signals of said first, third and sixth inverters;

a second NAND gate for performing a NAND-operation of the output signals of said first, sixth and seventh inverters;

a third NAND gate for performing a NAND-operation of the output signals of said second, fifth and eighth inverters;

a fourth NAND gate for performing a NAND-operation of the output signals of said fourth, sixth, seventh and ninth inverters;

a fifth NAND gate for performing a NAND-operation of the output signals of said second, sixth, eighth and ninth inverters;

a sixth NAND gate for performing a NAND-operation of the output signals of said second, fourth, sixth and ninth inverters;

a seventh NAND gate for performing a NAND-operation of the output signals of said fourth, fifth, eighth and ninth inverters;

an eighth NAND gate for performing a NAND-operation of the output signals of said second, fifth, seventh and tenth inverters;

a ninth NAND gate for performing a NAND-operation of the output signals of said second, third, fifth and tenth inverters;

a tenth NAND gate for performing a NAND-operation of the output signals of said first, fourth, fifth and eighth inverters;

an eleventh NAND gate for performing a NAND-operation of the output signals of said first, fourth, sixth, seventh and tenth inverters;

a twelfth NAND gate for performing a NAND-operation of the output signals of said second, third, sixth, seventh and tenth inverters;

a thirteenth NAND gate for performing a NAND-operation of the output signals of said first, fourth, seventh and tenth inverters;

a fourteenth NAND gate for performing a NAND-operation of the output signals of said second, third, eighth and eleventh inverters;

a fifteenth NAND gate for performing a NAND-operation of the output signals of said third, fifth, eighth and eleventh inverters;

a sixteenth NAND gate for performing a NAND-operation of the output signals of said first, third, fifth and eighth inverters;

a seventeenth NAND gate for performing a NAND-operation of the output signals of said second, fourth, fifth, tenth and eleventh inverters;

an eighteenth NAND gate for performing a NAND-operation of the output signals of said second, third, sixth, ninth and twelfth inverters;

a nineteenth NAND gate for performing a NAND-operation of the output signals of said fourth, sixth, ninth and eleventh inverters;

a twentieth NAND gate for performing a NAND-operation of the output signals of said first, fourth, eighth and ninth inverters;

a twenty-first NAND gate for performing a NAND-operation of the output signals of said fifth, eighth, ninth and eleventh inverters;

a twenty-second NAND gate for performing a NAND-operation of the output signals of said second, sixth, seventh, tenth and twelfth inverters;

a twenty-third NAND gate for performing a NAND-operation of the output signals of said second, sixth, eighth, tenth and eleventh inverters;

a twenty-fourth NAND gate for performing a NAND-operation of the output signals of said second, seventh, ninth and twelfth inverters;

a twenty-fifth NAND gate for performing a NTAND-operation of the output signals of said second, third, fifth, seventh, tenth and twelfth inverters;

a twenty-sixth NAND gate for performing a NAND-operation of the output signals of said first, fourth, fifth, seventh, tenth and twelfth inverters;

a twenty-seventh NAND gate for performing a NAND-operation of the output signals of said third, sixth, eighth, ninth and twelfth inverters;

a twenty-eighth NAND gate for performing a NAND-operation of the output signals of said second, fifth, eighth, tenth and twelfth inverters;

a twenty-ninth NAND gate for performing a NAND-operation of the output signals of said first, fourth, sixth, tenth and eleventh inverters;

a thirtieth NAND gate for performing a NAND-operation of the output signals of said sixth, eighth, ninth and eleventh inverters;

a thirty-first NAND gate for performing a NAND-operation of the output signals of said fourth, eighth, tenth and eleventh inverters;

a thirty-second NAND gate for performing a NAND-operation of the output signals of said fourth, seventh, ninth and twelfth inverters;

a thirty-third NAND gate for performing a NAND-operation of the output signals of said first, fourth, fifth, ninth and twelfth inverters;

a thirty-fourth NAND gate for performing a NAND-operation of the output signals of said second, third, fifth, eighth and twelfth inverters;

a thirty-fifth NAND gate for performing a NAND-operation of the output signals of said second, sixth, eighth and twelfth inverters;

a thirty-sixth NAND gale for performing a NAND-operation of the output signals of said second, fourth, sixth and twelfth inverters;

a thirty-seventh NAND gate for performing a NAND-operation of the output signals of said third, sixth, seventh and tenth inverters;

a thirty-eighth NAND gate for performing a NAND-operation of the output signals of said third, fifth, seventh and tenth inverters;

a thirty-ninth NAND gate for performing a NAND-operation of the output signals of said third, sixth, tenth and eleventh inverters;

a fortieth NAND gale for performing a NAND-operation of the output signals of said fourth, sixth, eighth and tenth inverters;

a forty-first NAND gale for performing a NAND-operation of the output signals of said first, fourth, tenth and twelfth inverters;

a forty-second NAND gate for performing a NAND-operation of the output signals of said first, fourth, seventh and tenth inverters;

a forty-third NAND gate for performing a NAND-operation of the output signals of said sixth, seventh, ninth and twelfth inverters;

a forty-fourth NAND gate for performing a NAND-operation of the output signals of said fourth, sixth, seventh and twelfth inverters;

a forty-fifth NAND gate for performing a NAND-operation of the output signals of said fourth, fifth, seventh, tenth and twelfth inverters;

a forty-sixth NAND gate for performing a NAND-operation of the output signals of said second, fourth, fifth, eighth and twelfth inverters;

a forty-seventh NAND gate for performing a NAND-operation of the output signals of said third, sixth, eighth, ninth and twelfth inverters;

a forty-eighth NAND gate for performing a NAND-operation of the output signals of said second, fourth, fifth, tenth and twelfth inverters;

a forty-ninth NAND gate for performing a NAND-operation of the output signals of said fifth, eighth, ninth and twelfth inverters;

a fiftieth NAND gate for performing a NAND-operation of the output signals of said eighth, tenth and eleventh inverters;

a fifty-first NAND gate for performing a NAND-operation of the output signals of said sixth, tenth and twelfth inverters;

a fifty-second NAND gate for performing a NAND-operation of the output signals of said third, sixth, eighth and twelfth inverters;

a fifty-third NAND gate for performing a NAND-operation of the output signals of said second, fourth, sixth and tenth inverters;

a fifty-fourth NAND gate for performing a NAND-operation of the output signals of said third, sixth, ninth and twelfth inverters a fifty-fifth NAND gate for performing a NAND-operation of the output signals of said eighth, tenth and twelfth inverters;

a fifty-sixth NAND gate for performing a NAND-operation of the output signals of said seventh, ninth and twelfth inverters;

a fifty-seventh NAND gate for performing a NAND-operation of the output signals of said fifth, ninth and twelfth inverters;

a fifty-eighth NAND gate for performing a NAND-operation of the output signals of said tenth and twelfth inverters;

a fifty-ninth NAND gate for performing a NAND-operation of the output signals of said fourth, sixth, eighth and twelfth inverters;

a first NOR gate; for performing a NOR-operation of the output signals of said second and third inverters and outputting an output bit $P_2$;

a second NOR gate for performing a NOR-operation of the output signals of said first inverter and said XNOR gate and outputting an output bit $P_3$;

a sixtieth NAND gate for performing a NAND-operation of the output signals of said first, second and third NAND gates;

a sixty-first NAND gate for performing a NAND-operation of the output signals of said fourth, fifth, sixth and seventh NAND gates;

a sixty-second NAND gate for performing a NAND-operation of the output signals of said eighth, ninth, tenth, eleventh and twelfth NAND gates;

a sixty-third NAND gate for performing a NAND-operation of the output signals of said thirteenth, fourteenth, fifteenth and sixteenth NAND gates;

a sixty-fourth NAND gate for performing a NAND-operation of the output signals of said seventeenth, eighteenth, nineteenth and twentieth NAND gates;

a sixty-fifth NAND gate for performing a NAND-operation of the output signals of said twenty-first, twenty-second, twenty-third, twenty-fourth and twenty-fifty NAND gates;

a sixty-sixth NAND gate for performing a NAND-operation of the output signals of said twenty-sixth, twenty-seventh, twenty-eighth and twenty-ninth NAND gates;

a sixty-seventh NAND gate for performing a NAND-operation of the output signals of said thirtieth thirty-first, thirty-second and thirty-third NAND gates;

a sixty-eighth NAND gate for performing a NAND-operation of the output signals of said thirty-fourth, thirty-fifth, thirty-sixth and thirty-seventh NAND gates;

a sixty-ninth NAND gate for performing a NAND-operation of the output signals of said thirty-eighth, thirty-ninth, fortieth and forty-first NAND gates;

a seventieth NAND gate for performing a NAND-operation of the output signals of said forty-second, forty-third, forty-fourth and forty-fifth NAND gates;

a seventy-first NAND gate for performing a NAND-operation of the output signals of said forty-sixth and forty-seventh NAND gates;

a seventy-second NAND gate for performing a NAND-operation of the output signals of said forty-eighth, forty-ninth fiftieth, fifty-first, fifty-second and fifty-third NAND gates;

a seventy-third NAND gate for performing a NAND-operation of the output signals of said fifty-fourth, fifty-sixth, fifty-seventh and fifty-eighth NAND gates;

a seventy-fourth NAND gate for performing a NAND-operation of the output signals of said fifty-ninth and sixtieth NAND gates;

a first OR gate for performing an OR-operation of the output signals of said sixty-first and sixty-second NAND gates and outputting an output signal $P_5$;

a second OR gate for performing an OR-operation of the output signals of said sixty-third, sixty-fourth and sixty-fifth NAND gates and outputting an output signal $P_6$;

a third OR gate for performing an OR-operation of the output signals of said sixty-sixth, sixty-seventh and sixty-eighth NAND gates and outputting an output signal $P_7$;

a fourth OR gate for performing an OR-operation of the output signals of said sixty-ninth, seventieth and seventy-first NAND gates and outputting an output signal $P_8$; and a buffer for inputting and buffering ground voltage and outputting an output bit $P_1$.

* * * * *

UNITED STATES PATENT AND TRADEMARK OFFICE
CERTIFICATE OF CORRECTION

PATENT NO. : 5,394,350
DATED : February 28, 1995
INVENTOR(S) : Jun-jin Gong et al.

It is certified that error appears in the above-indentified patent and that said Letters Patent is hereby corrected as shown below:

Col. 6, lines 16 should be -- $P_6 = \bar{A}_0 A_1 \bar{A}_3 A_4$ v $A_0 \bar{A}_2 A_3 \bar{A}_5$ v $\bar{A}_1 \bar{A}_2 A_3 \bar{A}_5$ v --; Col. 6, line 18 should be -- $A_1 A_3 \bar{A}_4 \bar{A}_5$ v $\bar{A}_0 A_1 A_3 \bar{A}_4$ v $\bar{A}_2 A_3 \bar{A}_4 \bar{A}_5$ v --; Col. 6, line 51 should be -- $P_6 = \overline{\{(\overline{\bar{A}_0 A_1 \bar{A}_3 A_4})(\overline{A_0 \bar{A}_2 A_3 \bar{A}_5})(\overline{\bar{A}_1 \bar{A}_2 A_3 \bar{A}_5})\}}$ --;

<u>In the Claims:</u> Col. 10, line 8 (claim 2) after $A_0$ insert a comma; Col. 10, line 48 (claim 3), after $A_0$ insert a comma; Col. 10, line 53 (claim 3), after "input" insert -- bit --; Col. 11, line 49 (claim 4), after $A_0$ insert a comma; Col. 12, line 16 (claim 4), "gale" should be -- gate --; Col. 12, line 22 (claim 4), after "inverters;" insert a paragraph break; Col. 13, line 59 (claim 5), after $A_0$ insert a comma; Col. 15, line 11 (claim 5), "NTAND" should be -- NAND --.

Signed and Sealed this

Eighteenth Day of July, 1995

Attest:

BRUCE LEHMAN

*Attesting Officer*     *Commissioner of Patents and Trademarks*